United States Patent [19]

Avellino

[11] Patent Number: 5,212,469
[45] Date of Patent: May 18, 1993

[54] TRAILER LAMP CONTROLLER

[75] Inventor: Frank J. Avellino, Russell, Pa.

[73] Assignee: GTE Products Corporation, Danvers, Mass.

[21] Appl. No.: 529,846

[22] Filed: May 29, 1990

[51] Int. Cl.⁵ .................. B60Q 1/34; G08B 21/00
[52] U.S. Cl. ............................. 340/475; 340/431; 307/9.1; 307/10.8
[58] Field of Search ............ 340/475, 431; 307/9.1, 307/10.8; 280/DIG. 14

[56] References Cited

U.S. PATENT DOCUMENTS 3,467,830 9/1969 Dobrikin .
3,671,757 6/1972 Klein .
3,896,415 7/1975 Carter, III ........................... 340/431
3,981,544 9/1976 Tomecek et al. .................... 340/431
4,006,453 2/1977 Bryant ................................. 340/431
4,064,416 12/1977 Andersen ............................ 340/431

Primary Examiner—Donnie L. Crosland
Attorney, Agent, or Firm—William H. McNeill

[57] ABSTRACT

A trailer lamp controller for use in connecting electrical circuits of turn and brake lamps of a towing vehicle to electrical circuits of turn and brake lamps of a towed vehicle, the turn and brake lamps of the towed vehicle being actuated in response to the sensing by the controller of current or voltage present when select towing vehicle turn and brake lamps are actuated.

17 Claims, 3 Drawing Sheets

TRAILER LAMP CONTROLLER

CROSS-REFERENCE TO RELATED APPLICATION

Ser. No. 07/529,841, now abandoned; filed concurrently herewith, contains related subject matter.

BACKGROUND OF THE INVENTION

1. Field of the Invention

The present invention relates to a trailer lamp controller which is useful in connecting a plurality of electrical circuits of turn and brake lamps of a towing vehicle to a plurality of electrical circuits of turn and brake lamps of a towed vehicle.

2. Description of the Prior Art

The need for electrically connecting circuits of a first vehicle to circuits of a second vehicle is well known. For example, when a trailer is hitched to an automobile it is desirable to connect various automobile lighting circuits to corresponding trailer lighting circuits. In particular, it is desirable to connect the automobile brake light circuit and turn signal circuit to corresponding trailer light circuits. Heretofore, one known manner by which the electrical connection of trailer lamps to a towing vehicle has been effected is by tapping a connector into the wiring of the towing vehicle lamps and then connecting the trailer lamps directly to such connector. With the various domestic and foreign lighting, wiring and control systems presently in use, a variety of types and designs of connectors have been required. Some of the known systems having required the use of solid state and mechanical relay parts. The degree of success of such different connectors has varied with some connectors not functioning properly, if at all.

Efforts have been made to provide a more standard connector. For example, efforts have been made using components such as phototransistors, photoresistors, photodiodes, and the like to sense the light from the lamp of a towing vehicle and using such sensed light to actuate a corresponding lamp in a trailer. However, problems have been encountered due to the presence of false indications from extraneous light sources such as the sun and headlights of other vehicles. In addition, the use of such light sensing components requires the presence of corresponding electronic circuitry which presents further problems with reliability and adds to the cost of producing such apparatus.

It is highly desirable to provide a trailer lamp controller for connecting electrical circuits of a towing vehicle to corresponding electrical circuits of a towed vehicle which can be used with the lighting, wiring and control systems of any domestic and foreign vehicle. It is also desirable to provide such a controller which does not require the use of solid state in combination with mechanical relay parts. It is further desirable to provide such a controller which does not rely upon the use of light sensing components in combination with corresponding electronic circuitry. It is further desirable to provide such a controller which functions independent of the presence of light and which therefore is not adversely affected by any extraneous light sources. It is also desirable to provide such a controller which will be operative whether plus or ground is switched. It is further desirable to provide a relatively inexpensive device for use as described herein having few components and improved reliability. It is also desirable to provide such a device for use with a towing vehicle having separate and distinct turn and stop lamp filaments and a towed vehicle having the same filament for turn and stop signals.

SUMMARY OF THE INVENTION

This invention achieves these and other results by providing a trailer lamp controller for use with a vehicle assembly including a towing vehicle and a towed vehicle. The controller comprises a first sensing means electrically connected to a first towing vehicle turn lamp means and a first towed vehicle lamp for sensing current or voltage when the first towing vehicle turn lamp means is on and then responsively turning the first towed vehicle lamp on. A second sensing means is also provided electrically connected to a second towing vehicle turn lamp means and a second towed vehicle lamp for sensing current or voltage when the second towing vehicle turn lamp means is on and then responsively turning the second towed vehicle lamp on.

DESCRIPTION OF THE PREFERRED EMBODIMENT

Figure 1:
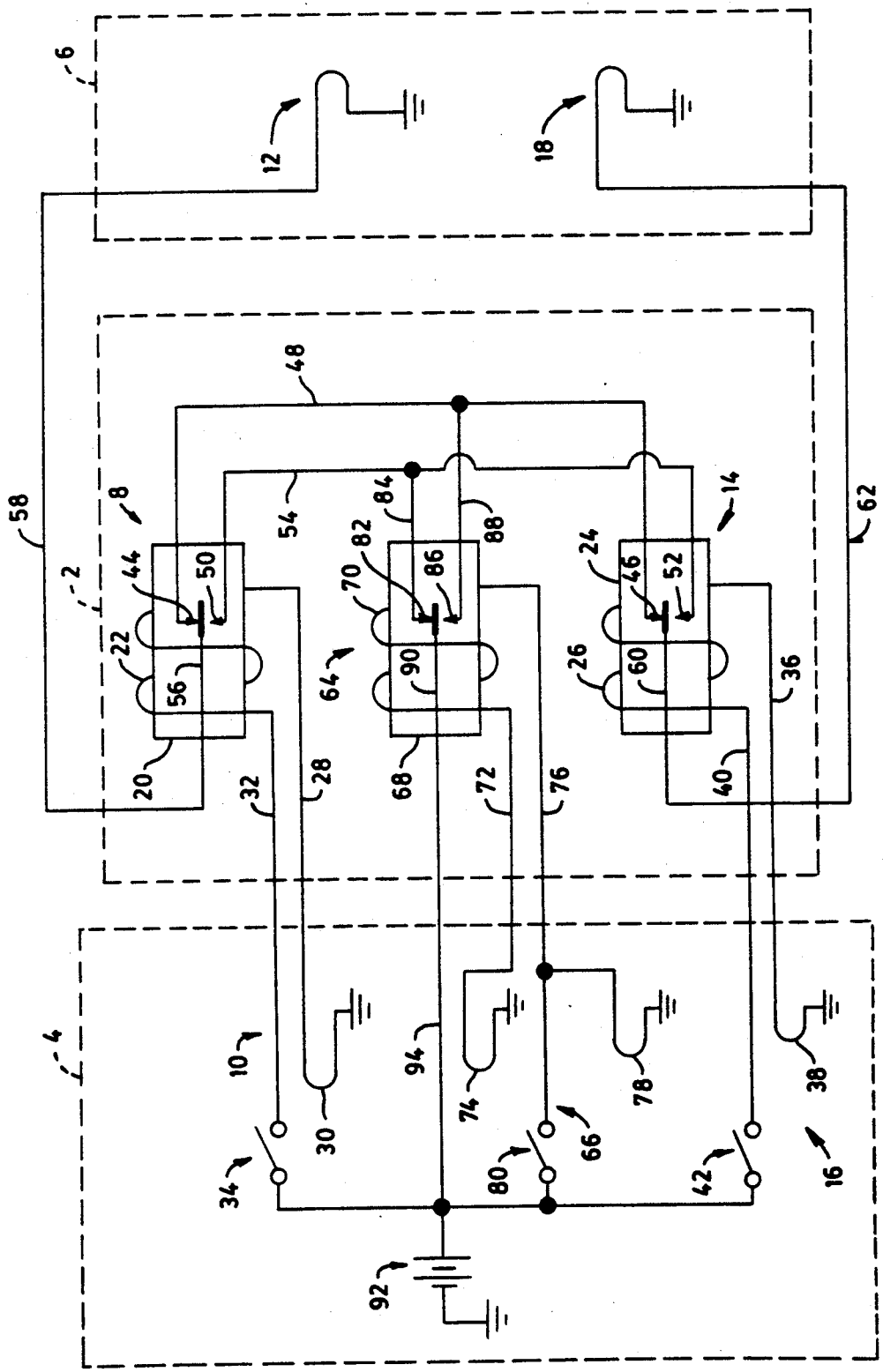
FIG. 1 is a circuit diagram illustrating a trailer lamp controller according to the present invention.

The embodiment of this invention which is illustrated in FIG. 1 is particularly suited for achieving the objects of this invention. FIG. 1 schematically depicts a trailer lamp controller 2 of the present invention for use with a vehicle assembly including a towing vehicle 4 such as, for example, an automobile, and a towed vehicle 6 such as, for example, a trailer. In FIG. 1, the towing vehicle includes separate filaments for respective turn and stop lamps and the towed vehicle includes the same filament for respective turn and stop lamps.

A first sensing means 8 is electrically connected to a first towing vehicle turn lamp means 10 and a first towed vehicle lamp 12 for sensing current when the first towing vehicle turn lamp means 10 is on and then responsively turning the first towed vehicle lamp 12 on. In a like manner, a second sensing means 14 is electrically connected to a second towing vehicle turn lamp means 16 and a second towed vehicle lamp 18 for sensing current when the second towing vehicle turn lamp means 16 is on and then responsively turning the second towed vehicle lamp 18 on.

In the embodiment of FIG. 1, the first means 8 includes a first switch 20 electrically connected to the first towed vehicle lamp 12. A first switching means 22 is also provided which is electrically connected to the first towing vehicle turn lamp means 10 for switching the first switch 20 when the first towing vehicle turn lamp means 10 is on. In a like manner, the second means 14 includes a second switch 24 electrically connected to the second towed vehicle lamp 18. A second switching means 26 is also provided which is electrically connected to the second towing vehicle turn lamp means 16 for switching the second switch 24 when the second towing vehicle turn lamp means 16 is on.

In considering the details of the embodiment of FIG. 1, the first switch 20 is a reed switch and the switching means 22 is a coil which extends around such reed switch. The coil includes a first lead 28 electrically connected to a first towing vehicle turn lamp 30 and a second lead 32 electrically connected to a first towing vehicle turn lamp switch 34. Each turn lamp switch is depicted herein as a single pole switch for purposes of illustration only and to simplify the drawings, it being known that various switching arrangements are used with right and left hand turn signals in a typical vehicle turn lamp switching system. The first towing vehicle turn lamp means 10 comprises the lamp 30 and the switch 34. In a like manner, the second switch 24 is also a reed switch and the switching means 26 is also a coil which extends around such reed switch. The coil includes a first lead 36 electrically connected to a second towing vehicle turn lamp 38 and a second lead 40 electrically connected to a second towing vehicle turn lamp switch 42. The second towing vehicle turn lamp means 16 comprises the lamp 38 and the switch 42.

In considering the details of each respective reed switch, FIG. 1 depicts reed switch 20 including a first contact 44 electrically connected to a first contact 46 of the reed switch 24 by means of a lead 48. The second contact 50 of reed switch 20 is electrically connected to a second contact 52 of reed switch 24 by means of a lead 54. Reed switch 20 further includes a reed 56 electrically connected to the first towed vehicle lamp 12 by means of lead 58 and moveable for selective engagement between contacts 44 and 50. In a like manner, reed switch 24 includes a reed 60 electrically connected to the second towed vehicle lamp 18 by means of lead 62 and moveable for selective engagement between contacts 46 and 52.

In the embodiment of FIG. 1, the trailer lamp controller 2 also includes a third sensing means 64 electrically connected to brake lamp means 66 of the towing vehicle 4 and to the first sensing means 8 and second sensing means 14 for sensing current when the brake lamp means 66 is on and then responsively turning the lamps 12 and 18 on through respective sensing means 8 and 14. Third means 64 includes a third switch 68 electrically connected to the first switch 20 and second switch 24. A third switching means 70 is also provided which is electrically connected to brake lamp means 66 for switching the third switch 68 when the brake lamp means 66 is on.

The third switch 68 is a reed switch and the third switching means 70 is a coil which extends around such reed switch. Coil 70 includes a first lead 72 electrically connected to a first brake lamp 74 of the towing vehicle 4 and a second lead 76 electrically connected to a second brake lamp 78 of the towing vehicle 4 and a brake lamp switch 80. The brake lamp means 66 comprises the lamps 74 and 78 and the switch 80.

In considering the details of reed switch 68, FIG. 1 depicts reed switch 68 including a first contact 82 electrically connected to contacts 50 and 52 by means of leads 84 and 54 and a second contact 86 electrically connected to contacts 44 and 46 by means of leads 88 and 48. Reed switch 68 further includes a reed 90 electrically connected to a power source 92 by means of lead 94 and movable for selective engagement between contacts 82 and 86. Switches 34, 42 and 80 are also electrically connected to power source 92 through lead 92. As will be explained in more detail herein, reeds 56, 60 and 90 engage contacts 44, 46 and 82, respectively, when respective coils 22, 26 and 70 are not energized.

In the embodiment of FIG. 1 each coil is in series with a respective towing vehicle lamp and each coil is wrapped around a respective reed switch. Each coil senses current when a respective lamp is actuated in the towing vehicle and switches a respective reed switch to actuate a respective lamp of the towed vehicle. In particular, when a respective towing vehicle lamp is actuated the current from the lamp flows through the respective coil causing a magnetic field to build up and actuate the respective reed switch thereby causing the current to flow to and actuate the corresponding towed vehicle lamp. For example, when switch 34, which could be a left-hand turn signal switch, is closed, current will flow through coil 22 to actuate the towing turn lamp 30. Such flow of current also causes a magnetic field to build up at coil 22 which thereby actuates the reed 56 from contact 44 to contact 50. The engagement of reed 56 with contact 50 closes a circuit between power source 92 and towed lamp 12 to actuate lamp 12. Such circuit extends from power source 92 through lead 94, reed 90 contact 82, lead 84, lead 54, contact 50, reed 56 and lead 58. Although the details of a typical turn signal are not described, such details being well known in the art, it will be understood that as the lamp 30 is caused to repeatedly blink on and off in a known manner, each time lamp 30 is actuated current will flow through coil 22 causing reed 56 to engage contact 50. Each time lamp 30 is turned off such flow of current will cease, thereby eliminating the magnetic field at coil 22 and causing reed 56 to return to its normal position at contact 44 to thereby remove power from lamp 12. Lamp 18 is caused to be actuated in a similar manner through the closing of switch 42, which could be a right-hand turn signal switch, which will cause a magnetic field to build up at coil 26 which thereby actuates the reed 60 from contact 46 to contact 52.

In a like manner, when switch 80, which is a brake signal switch, is closed, current will flow to brake lamp 78 to actuate lamp 78, and through coil 70 to actuate brake lamp 74. Such flow of current will also cause a magnetic field to build up at coil 70 which thereby actuates the reed 90 from contact 82 to contact 86. The engagement of reed 90 with contact 86 closes a circuit between power source 92 and towed lamps 12 and 18 so that when the brakes are applied and switch 80 is closed in the usual manner, the trailer lamps 12 and 18 will be actuated. Such circuit extends from power source 92 through lead 94, reed 90, contact 86, lead 88 and lead 48. Lead 48 extends to contacts 44 and 46. Since the normal position of reeds 56 and 60 is at contacts 44 and 46, respectively, the current flows through contact 44, reed 56 and lead 58 to lamp 12, and through contact 46, reed 60 and lead 62 to lamp 18.

Figure 2:
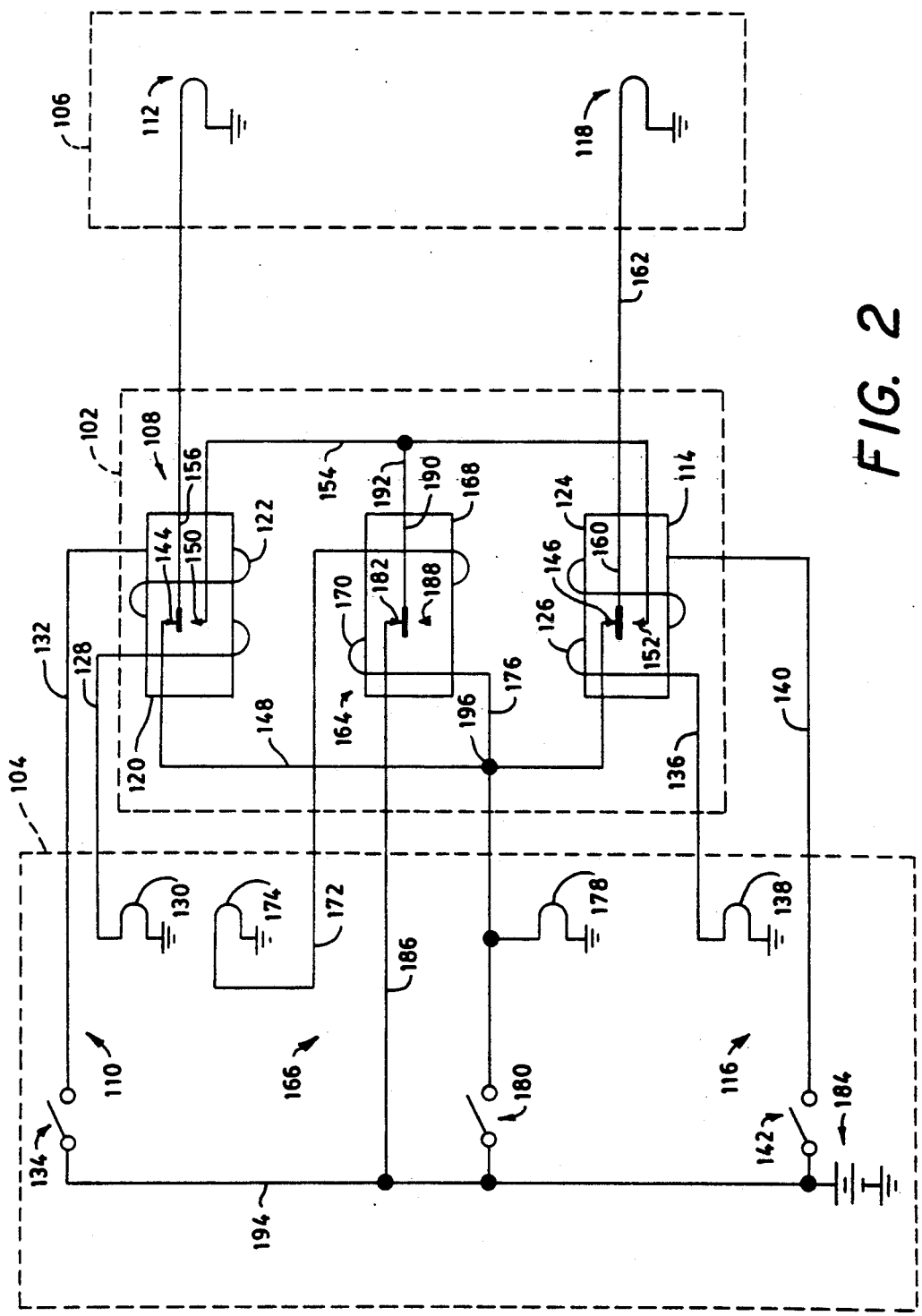
FIG. 2 is a circuit diagram illustrating an alternative trailer lamp controller according to the present invention.

In an alternative embodiment depicted in FIG. 2, a trailer lamp controller 102 is depicted for use with a vehicle assembly including a towing vehicle 104 and a towed vehicle 106. A first sensing means 108 is electrically connected to a first towing vehicle turn lamp means 110 and a first towed vehicle lamp 112 for sensing current when the first towing vehicle turn lamp means 110 is on and then responsively turning the first towed vehicle lamp 112 on. In a like manner, a second sensing means 114 is electrically connected to a second towing vehicle turn lamp means 116 and a second towed vehicle lamp 118 for sensing current when the second towing vehicle turn lamp means 116 is on and then responsively turning the second towed vehicle lamp 118 on.

In the embodiment of FIG. 2, the first means 108 includes a first switch 120 electrically connected to the first towed vehicle lamp 112. A first switching means 122 is also provided which is electrically connected to the first towing vehicle turn lamp means 110 for switching the first switch 120 when the first towing vehicle turn lamp means is on. In a like manner, the second means 114 includes a second switch 124 electrically connected to the second towed vehicle lamp 118. A second switching means 126 is also provided which is electrically connected to the second towing vehicle turn lamp means 116 for switching the second switch 124 when the second towing vehicle turn lamp means is on.

In considering the details of the embodiment of FIG. 2, the first switch 120 is a reed switch and the switching means 122 is a coil which extends around such reed switch. The coil includes a first lead 128 electrically connected to a first towing vehicle turn lamp 130 and a second lead 132 electrically connected to a first towing vehicle turn lamp switch 134. The first towing vehicle turn lamp means 110 comprises the lamp 130 and the switch 134. In a like manner, the second switch 124 is also a reed switch and the switching means 126 is also a coil which extends around such reed switch. The coil includes a first lead 136 electrically connected to a second towing vehicle turn lamp 138 and a second lead 140 electrically connected to a second towing vehicle turn lamp switch 142. The second towing vehicle turn lamp means 116 comprises the lamp 138 and the switch 142.

In considering the details of each respective reed switch, FIG. 2 depicts reed switch 120 including a first contact 144 electrically connected to a first contact 146 of the reed switch 124 by means of a lead 148. The second contact 150 of reed switch 120 is electrically connected to a second contact 152 of reed switch 124 by means of a lead 154. Reed switch 120 further includes a reed 156 electrically connected to the first towed vehicle lamp 112 by means of lead 158 and moveable for selective engagement between contacts 144 and 150. In a like manner, reed switch 124 includes a reed 160 electrically connected to the second towed vehicle lamp 118 by means of lead 162 and moveable for selective engagement between contacts 146 and 152.

In the embodiment of FIG. 2, the trailer lamp controller 102 also includes a third sensing means 164 electrically connected to brake lamp means 166 of the towing vehicle 104 and to the first sensing means 108 and second sensing means 114 for sensing current when the brake lamp means 166 is on. Third means 164 includes a third switch 168 electrically connected to the first switch 120 and second switch 124. A third switching means 170 is also provided which is electrically connected to brake lamp means 166 for switching the third switch 168 when the brake lamp means 166 is on.

The third switch 168 is a reed switch and the third switching means 170 is a coil which extends around such reed switch. Coil 170 includes a first lead 172 electrically connected to a first brake lamp 174 of the towing vehicle 104 and a second lead 176 electrically connected to a second brake lamp 178 of the towing vehicle 104 and a brake lamp switch 180. The brake lamp means 166 comprises the lamps 174 and 178 and the switch 180.

In considering the details of reed switch 168, FIG. 2 depicts reed switch 168 including a first contact 182 electrically connected to a power source 184 by means of lead 186, and a second open contact 188. Reed switch 168 further includes a reed 190 electrically connected to the contacts 150 and 154 by means of leads 192 and 154 for selective engagement between contacts 182 and 188. Switches 134, 142 and 180 are also electrically connected to power source 184 through lead 194. As will be explained in more detail herein, reeds 156, 160 and 190 engage contacts 144, 146 and 182, respectively, when respective coils 122, 126 and 170 are not energized.

As in the trailer lamp controller of FIG. 1, in the embodiment of FIG. 2 each coil is in series with a respective towing vehicle lamp and each coil is wrapped around a respective reed switch. When a respective towing vehicle lamp is actuated the current from the lamp flows through the respective coil causing a magnetic field to build up and actuate the respective reed switch. For example, when switch 134, which could be a left-hand turn signal switch, is closed, current will flow through coil 122 to actuate the towing turn lamp 130. Such flow of current also causes a magnetic field to build up at coil 122 which thereby actuates the reed 156 from contact 144 to contact 150. The engagement of reed 156 with contact 150 closes a circuit between power source 184 and towed lamp 112 to actuate lamp 112. Such circuit extends from power source 184, through lead 194, lead 186, contact 182, reed 190, lead 192, lead 154, contact 150, reed 156 and lead 158. As in the embodiment of FIG. 1, it will be understood that as the lamp 130 is caused to repeatedly blink on and off, each time lamp 130 is actuated current will flow through coil 122 causing reed 156 to engage contact 150. Each time lamp 130 is turned off such flow of current will cease, thereby eliminating the magnetic field at coil 122 and causing reed 156 to return to its normal position at contact 144 to thereby remove power from lamp 112. Lamp 118 is caused to be actuated in a similar manner through the closing of switch 142, which could be a right-hand turn signal switch, which will cause a magnetic field to build up at coil 126 which thereby actuates the reed 160 from contact 146 to contact 152.

In the embodiment of FIG. 2, when switch 180, which is a brake signal switch, is closed, lamps 174 and 178 will be actuated as current flows to lamp 178 and through coil 170 to lamp 174. However, the embodiment of FIG. 2 differs from that of FIG. 1 in that by virtue of junction 196 current will also flow directly to contacts 144 and 146. Since the normal position of reeds 156 and 160 is at contacts 144 and 146, respectively, the current will flow through contact 144, reed 156 and lead 158 to lamp 112, and through contact 146, reed 160 and lead 162 to lamp 118. The current flowing through coil 170 will cause a magnetic field to build up at coil 170 which thereby actuates the reed 190 from contact 182 to the open contact 188. This removes the power source from reed 190 which will allow either turn signal to function even when the brake switch 180 has been actuated. For example, if switches 134 and 180 are both closed, lamp 112 will only receive current and be actuated when reed 156 engages contact 144, not when reed 156 engages contact 150.

Figure 3:
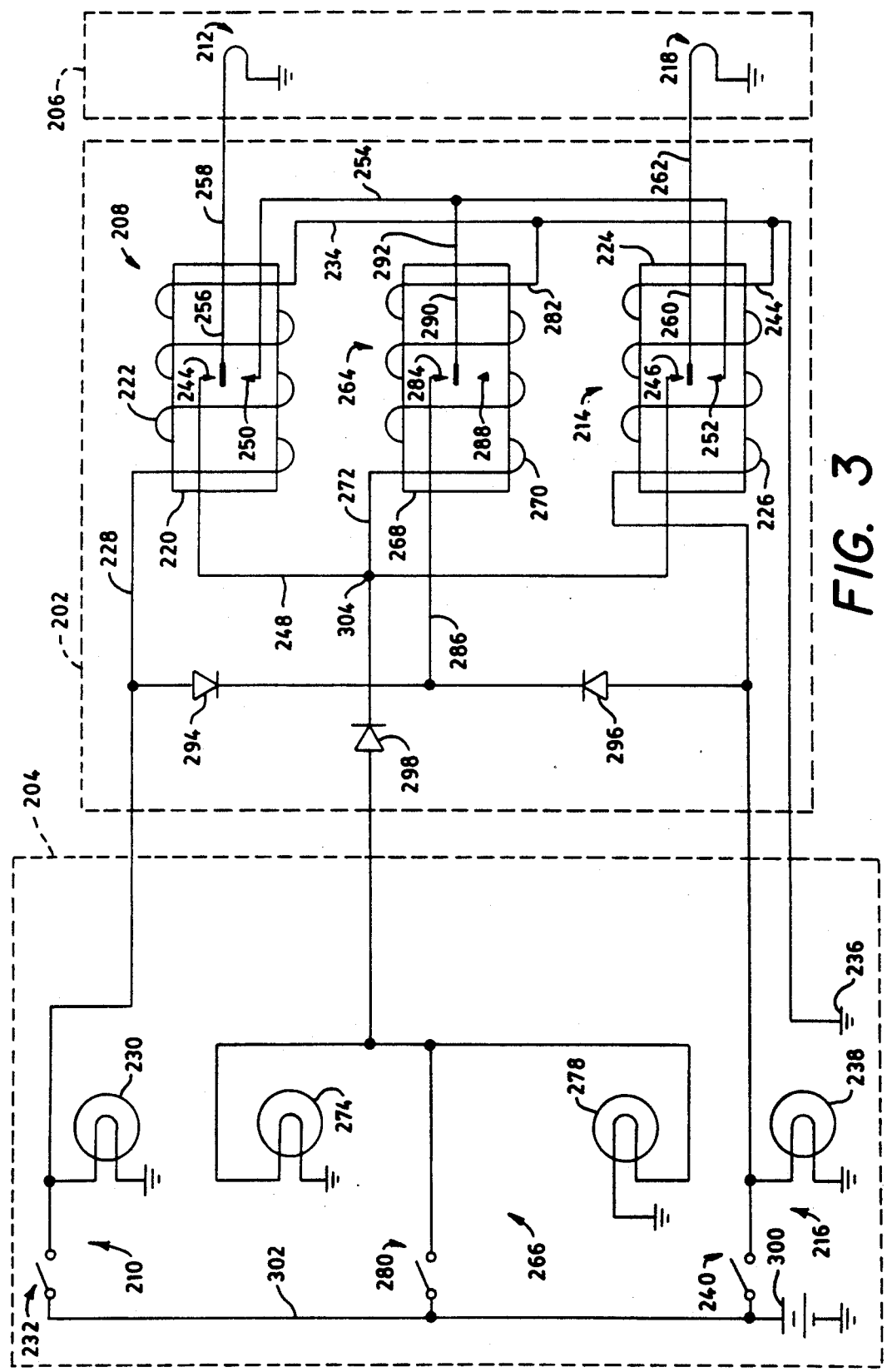
FIG. 3 is a circuit diagram illustrating yet another alternative trailer lamp controller according to the present invention.

One of the disadvantages of the trailer lamp controller of FIGS. 1 and 2 is that failure of a towing vehicle lamp will cause failure of a corresponding towed vehicle lamp. The embodiment of FIG. 3 is designed to overcome this problem. In particular, whereas the embodiments of FIGS. 1 and 2 are current dependent, the alternative embodiment of FIG. 3 is voltage dependent. FIG. 3 depicts a trailer lamp controller 202 for use with a vehicle assembly including a towing vehicle 204 and a towed vehicle 206. A first sensing means 208 is electrically connected to a first towing vehicle turn lamp means 210 and a first towed vehicle lamp 212 for sensing voltage when the first towing vehicle turn lamp means 210 is on and then responsively turning the first towed vehicle lamp 212 on. In a like manner, a second sensing means 214 is electrically connected to a second towing vehicle turn lamp means 216 and a second towed vehicle lamp 218 for sensing voltage when the second towing vehicle turn lamp means 216 is on and then responsively turning the second towed vehicle lamp 218 on.

In the embodiment of FIG. 3, the first sensing means 208 includes a first switch 220 electrically connected to the first towed vehicle lamp 212. A first switching means 222 is also provided which is electrically connected to the first towing vehicle turn lamp means 210 and to ground for switching the first switch 220 when the first towing vehicle turn lamp means is on. In a like manner, the second means 214 includes a second switch 224 electrically connected to the second towed vehicle lamp 218. A second switching means 226 is also provided which is electrically connected to the second towing vehicle turn lamp means 216 and to ground for switching the second switch 224 when the second towing vehicle turn lamp means is on.

In considering the details of the embodiment of FIG. 3, the first switch 220 is a reed switch and the switching means 222 is a coil which extends around such reed switch. The coil includes a first lead 228 electrically connected to a first towing vehicle turn lamp 230 and a first towing vehicle turn lamp switch 232 and a second lead 234 electrically connected to ground 236. The first towing vehicle turn lamp means 210 comprises the lamp 230 and the switch 232. In a like manner, the second switch 224 is also a reed switch and the switching means 226 is also a coil which extends around such reed switch. The coil includes a first lead electrically connected to a second towing vehicle turn lamp 238 and a second towing vehicle turn lamp switch 240 and a second lead 242 electrically connected to ground 236. The second towing vehicle turn lamp means 216 comprises the lamp 238 and the switch 240.

In considering the details of each respective reed switch, FIG. 3 depicts reed switch 220 including a first contact 244 electrically connected to a first contact 246 of the reed switch 224 by means of a lead 248. The second contact 250 of reed switch 220 is electrically connected to a second contact 252 of reed switch 224 by means of a lead 254. Reed switch 220 further includes a reed 256 electrically connected to the first towed vehicle lamp 212 by means of lead 258 and moveable for selective engagement between contacts 244 and 250. In a like manner, reed switch 224 includes a reed 260 electrically connected to the second towed vehicle lamp 218 by means of lead 262 and moveable for selective engagement between contacts 246 and 252.

In the embodiment of FIG. 3, the trailer lamp controller 202 also includes a third sensing means 264 electrically connected to brake lamp means 266 of the towing vehicle 204 and to the first sensing means 208 and second sensing means 214 for sensing voltage when the brake lamp means 266 is on. Third sensing means 264 includes a third switch 268 electrically connected to the first switch 220 and second switch 224. A third sensing means 270 is also provided which is electrically connected to brake lamp means 266 and to ground 236 for switching the third switch 268 when the brake lamp means 266 is on.

The third switch 268 is a reed switch and the third switching means 270 is a coil which extends around such reed switch. Coil 270 includes a first lead 272 electrically connected to a first brake lamp 274 of the towing vehicle 204, to a second brake lamp 278 of the towing vehicle 204 and to a brake lamp switch 280. A second lead 282 is electrically connected to ground 236. The brake lamp means 266 comprises the lamps 274 and 278 and the switch 280.

In considering the details of reed switch 268, FIG. 3 depicts reed switch 268 including a first contact 284 electrically connected to the towing vehicle turn lamp means 210 and 216 by means of lead 286, and an open second contact 288. Reed switch 268 also includes a reed 290 electrically connected to second contacts 250 and 252 by means of leads 292 and 234 and moveable for selective engagement between contacts 284 and 288. A first diode 294 is electrically connected between the first vehicle turn lamp means 210 and contact 284, a second diode 296 is electrically connected between the second towing vehicle turn lamp means 216 and contact 284, and a third diode 298 is electrically connected between the brake lamp means 266 and the coil 270 and contacts 244 and 246. As depicted in FIG. 3, diodes 294, 296 and 298 are directionally oriented to block voltage from the first sensing means 208, second sensing means 214 and third sensing means 264 towards the first and second towing vehicle turn lamp means 210, 216 and the brake lamp means 266. Switches 232, 240 and 280 are electrically connected to power source 300 through lead 302. As will be explained in more detail herein, reeds 256, 260 and 290 engage contacts 244, 246 and 284, respectively, when respective coils 222, 226 and 270 are not energized.

It will be apparent that in the embodiment of FIG. 3, instead of sensing current in the towing vehicle lamps, the coils 222, 226, 270 sense voltage. In this manner, even if a towing vehicle lamp fails, the trailer lamps will still be actuated when a switch 232, 240, 280 is closed. In particular, when a respective switch 232, 240, 280 is closed current flows through the respective coil causing a magnetic field to build up and actuate the respective reed switch thereby causing the current to flow to and actuate the corresponding towed vehicle lamp. For example, when switch 232, which could be a left-hand turn signal switch, is closed, current will flow to and actuate lamp 230. Current will also flow through coil 222 to ground 236 regardless of whether lamp 230 is functioning. Such flow of current causes a magnetic field to build up at coil 222 which thereby actuates the reed 256 from contact 244 to contact 250. The engagement of reed 256 with contact 250 closes a circuit between power source 300 and towed lamp 212 to actuate lamp 212. Such circuit extends from power source 300 through lead 302, switch 232, lead 228, diode 294, lead 286, contact 284, reed 290, lead 292, lead 254, contact 250, reed 256 and lead 258. As the typical turn signal switching device (not shown) is caused to repeatedly blink on and off in the usual manner, each time such device is actuated current will flow through coil 222 causing reed 256 to engage contact 250. Each time such device is turned off such flow of current will cease, thereby eliminating the magnetic field at coil 222 and causing reed 256 to return to its normal position at contact 244 to thereby remove power from lamp 212. Lamp 218 is caused to be actuated in a similar manner through the closing of switch 240, which could be a right-hand turn signal switch, which will cause a magnetic field to build up at coil 226 which thereby actuates the reed 260 from contact 246 to contact 252.

In the embodiment of FIG. 3, when switch 280, which is a brake signal switch, is closed, lamps 274 and 278 will be actuated as current flows directly from power source 300. However, the embodiment of FIG. 3 differs from that of FIG. 1 in that by virtue of junction 304 current will also flow directly to contacts 244 and 246. Since the normal position of reeds 256 and 260 is at contacts 244 and 246, respectively, the current will flow through contact 244, reed 256 and lead 258 to lamp 212, and through contact 246, reed 260 and lead 262 to lamp 218. The current will also flow through coil 270 and will cause a magnetic field to build up at coil 270 which thereby actuates the reed 290 from contact 284 to the open contact 288. This removes the power source from reed 290 which will allow either turn signal to function even when the brake switch 280 has been actuated. For example, if switches 232 and 280 are both closed, lamp 212 will only receive current and be actuated when reed 256 engages contact 244, not when reed 256 engages contact 250.

In the embodiments of FIGS. 1 and 2, a preferred reed switch is manufactured by Hermetic Switch, Inc. under model no. HSR-834WT. Such a reed switch is wrapped with No. 22 copper wire which has been plain coated with enamel. Preferably, there will be about 100 turns of such wire about the reed switch to provide a coil which senses current and switches the reed switch as described herein. A similar reed switch is preferred in the embodiment of FIG. 3, such reed switch being wrapped with No. 32 copper wire which has been plain coated with enamel. Preferably, there will be considerably more turns of such wire to dissipate the increased temperature incurred in the sensing of voltage as opposed to the sensing of current. For example, preferably there will be about 3000 turns of such wire to provide a coil which senses voltage and switches the reed switch as described herein.

The embodiments described herein provide circuitry which can be used with the lighting, wiring and control systems of any domestic and foreign vehicle. The use of solid state in combination with mechanical relay parts has been eliminated, as has the use of light sensing components in combination with corresponding electronic circuitry. The controller of the present invention functions independently of the presence of light and is therefore not adversely affected by any extraneous light sources. It will be apparent from the circuitry of FIGS. 1 to 3 that the controller will be operative whether plus or ground is switched and that the controller is useful with a towing vehicle having separate and distinct turn and stop lamp filaments and a towed vehicle having the same filament for turn and stop signals. The present controller is relatively inexpensive, and includes few components and provides improved reliability.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A trailer lamp controller for use with a vehicle assembly including a towing vehicle and a towed vehicle, comprising:
a first sensing means electrically connected to a first towing vehicle turn lamp and to a first towed vehicle lamp for sensing one of current and voltage when said first towing vehicle turn lamp is on and then responsively turning said first towed vehicle lamp on;
a second sensing means electrically connected to a second towing vehicle turn lamp and to a second towed vehicle lamp for sensing one of current and voltage when said second towing vehicle turn lamp is on and then responsively turning said second towed vehicle lamp on; said first sensing means including a first switch electrically connected to said first towed vehicle lamp, and a first switching means electrically connected to said first towing vehicle turn lamp for switching said first switch when said first towing vehicle turn lamp is on and wherein said second sensing means includes a second switch electrically connected to said second towed vehicle lamp, and a second switching means electrically connected to said second towing vehicle turn lamp for switching said second switch when said second towing vehicle turn lamp is on; said first switch being a first reed switch and said first switching means being a first coil which extends around said first reed switch, said first coil having a first lead electrically connected to a first towing vehicle turn lamp and a second lead electrically connected to a first towing vehicle turn lamp switch, and further wherein said second switch is a second reed switch and said second switching means is a second coil which extends around said second reed switch, said second coil having a first lead electrically connected to a second towing vehicle turn lamp and a second lead electrically connected to a second towing vehicle turn lamp switch; and said first reed switch including a first contact electrically connected to a first contact of said second reed switch, and a second contact electrically connected to a second contact of said second reed switch, and further wherein said first reed switch includes a first reed electrically connected to said first towed vehicle lamp and moveable for selective engagement between said first contact of said first reed switch and said second reed switch includes a second reed electrically connected to said second towed vehicle lamp and moveable for selective engagement between said first contact of said second reed switch and said second contact of said second reed switch.

2. The trailer lamp controller of claim 1 wherein each respective reed engages a respective first contact of a respective reed switch when a respective coil is de-energized.

3. The trailer lamp controller of claim 2 further including a third sensing means electrically connected to a brake lamp of said towing vehicle and to said first and second sensing means for sensing one of current and voltage when said brake lamp is on and then responsively turning said first and second towed vehicle lamps on through said first and second sensing means.

4. The trailer lamp controller of claim 3 wherein said third sensing means includes a third switch electrically connected to said first switch and said second switch, and third switching means electrically connected to said brake lamp for switching said third switch when said brake lamp is on.

5. The trailer lamp controller of claim 4 wherein said third switch is a third reed switch and said third switching means is a third coil which extends around said third reed switch, said third coil having a first lead electrically connected to a first brake lamp of said towing vehicle and a second lead electrically connected to a second brake lamp of said towing vehicle and to a brake lamp switch.

6. The trailer lamp controller of claim 5 wherein said third reed switch includes a first contact electrically connected to said second contacts of said first and second reed switches, and a second contact electrically connected to said first contacts of said first and second reed switches, and further wherein said third reed switches includes a third reed electrically connected to a power source and moveable for selective engagement between said first contact of said third reed switch and said second contact of said third reed switch.

7. The trailer lamp controller of claim 2 further including a third sensing means electrically connected to a brake lamp of said towing vehicle and to said first and second sensing means for sensing when said brake lamp is on.

8. The trailer lamp controller of claim 7 wherein said third sensing means includes a third switch electrically connected to said first switch and said second switch, and third switching means electrically connected to said brake lamp for switching said third switch when said brake lamp is on.

9. The trailer lamp controller of claim 8 wherein said third switch is a third reed switch and said third switching means is a third coil which extends around said third reed switch, said third coil having a first lead electrically connected to a first brake lamp of said towing vehicle and a second lead electrically connected to a second brake lamp of said towing vehicle and a brake lamp switch.

10. The trailer lamp controller of claim 9 wherein said third reed switch includes a first contact electrically connected to a power source, and a second contact, and further wherein said third reed switch includes a third reed electrically connected to said second contact of said first and second reed switch for selective engagement between said first contact of said third reed switch and said second contact of said third reed switch.

11. A trailer lamp controller for use with a vehicle assembly including a towing vehicle and a towed vehicle, comprising:
a first sensing means electrically connected to a first towing vehicle turn lamp and to a first towed vehicle lamp for sensing one of current and voltage when said first towing vehicle turn lamp is on and then responsively turning said first towed vehicle lamp on;
a second sensing means electrically connected to a second towing vehicle turn lamp and to a second towed vehicle lamp for sensing one of current and voltage when said second towing vehicle turn lamp is on and then responsively turning said second towed vehicle lamp on;
said first sensing means including a first switch electrically connected to said first towed vehicle lamp, and a first switching means electrically connected to said first towing vehicle turn lamp for switching said first switch when said first towing vehicle turn lamp is on and wherein said second sensing means includes a second switch electrically connected to said second towed vehicle lamp, and a second switching means electrically connected to said second towing vehicle turn lamp for switching said second switch when said second towing vehicle turn lamp is on;
said first switch being a first reed switch and said first switching means being a first coil which extends around said first reed switch, said first coil having a first lead electrically connected to said first towing vehicle turn lamp and a second lead electrically connected to ground, and further wherein said second switch is a second reed switch and said second switching means is a second coil which extends around said second reed switch, said second coil having a first lead electrically connected to said second towing vehicle turn lamp and a second lead electrically connected to ground; and
said first reed switch including a first contact electrically connected to a first contact of said second reed switch, and a second contact electrically connected to a second contact of said second reed switch, and further wherein said first reed switch includes a first reed electrically coupled to said first towed vehicle lamp and moveable for selective engagement between said first contact of said first reed switch and said second contact of said first reed switch, and wherein said second reed switch includes a second reed electrically connected to said second towed vehicle lamp and moveable for selective engagement between said first contact of said second reed switch and said second contact of said second reed switch.

12. The trailer lamp controller of claim 11 wherein each respective reed engages a respective first contact of a respective reed switch when a respective coil is de-energized.

13. The trailer lamp controller of claim 12 further including a third sensing means electrically connected to a brake lamp of said towing vehicle and to said first and second sensing means for sensing when said brake lamp is on.

14. The trailer lamp controller of claim 13 wherein said third sensing means includes a third switch electrically connected to said first switch and said second switch, and third switching means electrically connected to said brake lamp for switching said third switch when said brake lamp is on.

15. The trailer lamp controller of claim 14 wherein said third switch is a third reed switch and said third switching means is a third coil which extends around said third reed switch, said third coil having a first lead electrically connected to said brake lamp and a second lead electrically connected to ground.

16. The trailer lamp controller of claim 15 wherein said third reed switch includes a first contact electrically connected to said first towing vehicle turn lamp and to said second towing vehicle turn lamp, and a second contact, and further wherein said third reed switch includes a third reed electrically connected to said second contacts of said first and second reed switch and moveable for selective engagement between said first contact of said third reed switch and said second contact of said third reed switch.

17. The trailer lamp controller of claim 16 further including a first diode electrically connected between said first towing vehicle turn lamp and said first contact of said third reed switch, a second diode electrically connected between said second towing vehicle turn lamp and said first contact of said third reed switch, and a third diode electrically connected between (a) said brake lamp and (b) said third coil and said first contacts of said first and second reed switch, said first diode, said second diode and said third diode being directionally oriented to block voltage from said first, second and third sensing means towards said first and second towing vehicle turn lamp and said brake lamp.

* * * * *